(12) United States Patent
Löhlein et al.

(10) Patent No.: US 7,831,249 B2
(45) Date of Patent: Nov. 9, 2010

(54) TEST DEVICE FOR USE IN A TEST SYSTEM FOR CHECKING TRANSMISSION PROCEDURES IN A MOBILE TELEPHONY NETWORK

(75) Inventors: Martin Löhlein, Wendelstein (DE); Reinhard Bergmann, Schwabach (DE)

(73) Assignee: Keynote SIGOS GmbH, Nürnberg (DE)

( * ) Notice: Subject to any disclaimer, the term of this patent is extended or adjusted under 35 U.S.C. 154(b) by 368 days.

(21) Appl. No.: 11/722,923

(22) PCT Filed: Dec. 22, 2005

(86) PCT No.: PCT/EP2005/013878

§ 371 (c)(1),
(2), (4) Date: Jun. 27, 2007

(87) PCT Pub. No.: WO2006/069735

PCT Pub. Date: Jul. 6, 2006

(65) Prior Publication Data

US 2009/0075646 A1    Mar. 19, 2009

(30) Foreign Application Priority Data

Dec. 28, 2004   (DE) ................... 10 2004 062 963

(51) Int. Cl.
*H04W 24/00* (2009.01)
(52) U.S. Cl. .................. 455/423; 455/67.11; 455/425
(58) Field of Classification Search ........... 455/423, 455/67.11, 67.14, 226.1, 425, 558
See application file for complete search history.

(56) References Cited

U.S. PATENT DOCUMENTS

| | | | |
|---|---|---|---|
| 6,680,913 B1 * | 1/2004 | Malmivirta et al. | 370/249 |
| 6,687,499 B1 * | 2/2004 | Numminen et al. | 455/423 |
| 6,697,604 B1 * | 2/2004 | Rimpela et al. | 455/67.14 |
| 7,162,408 B2 * | 1/2007 | Kashyap et al. | 703/24 |
| 2004/0072591 A1 * | 4/2004 | Andreini | 455/558 |
| 2005/0101257 A1 * | 5/2005 | Prat et al. | 455/67.11 |

FOREIGN PATENT DOCUMENTS

| | | | |
|---|---|---|---|
| DE | 19959407 A1 * | 6/2001 | |
| DE | 10249086 A1 | 5/2004 | |
| WO | 0069196 A1 | 11/2000 | |
| WO | 02069656 A2 | 9/2002 | |
| WO | 2004049746 A1 | 6/2004 | |

* cited by examiner

*Primary Examiner*—CongVan Tran
(74) *Attorney, Agent, or Firm*—Browdy and Neimark, PLLC

(57) ABSTRACT

Test device (1) is for use in a test system for checking transmission procedures in a mobile telephony network. The test device (1) comprises a mobile telephone (2) configured such that it is able to communicate with a subscriber identification module (SIM). Furthermore, the test device (1) has a SIM simulation processor (4) associated locally with the mobile telephone (2), to prepare a SIM simulation which may be connected to other components of the test system. The test device (1) also has a physical SIM card (10) connected to the SIM simulation processor (4) such that the mobile telephone (2) is able to selectively communicate with the SIM simulation or with the physical SIM card (10). A test device (1) is thus provided, the use of which allows a greater flexibility of the SIM data used in the test process.

7 Claims, 1 Drawing Sheet

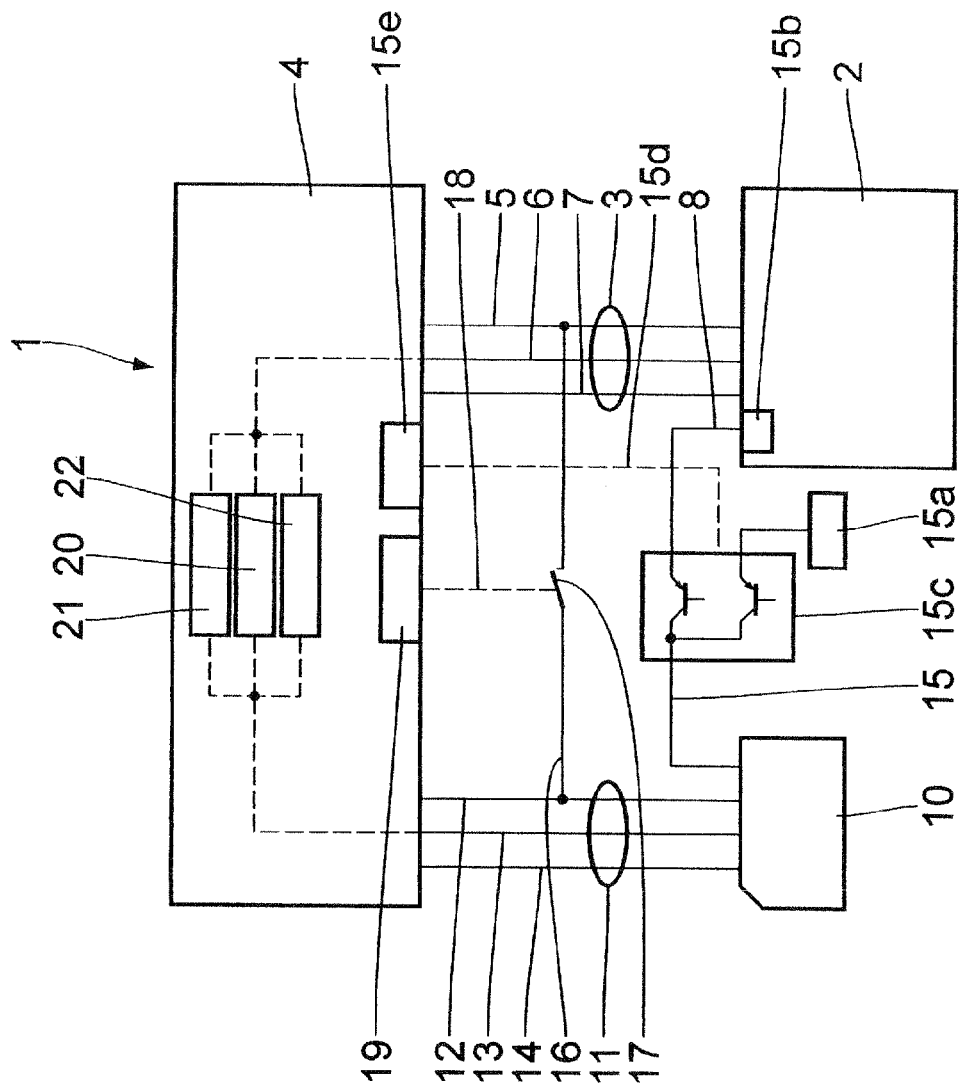

TEST DEVICE FOR USE IN A TEST SYSTEM FOR CHECKING TRANSMISSION PROCEDURES IN A MOBILE TELEPHONY NETWORK

The invention relates to a test device for use in a test system for checking transmission procedures in a mobile telephony network according to the preamble of claim 1.

A test device of this type as well as a test system in which this test device may be used are known from WO 2004/049 746 A1. Although this known test system allows a very practical test process, there is a need to make the test process more flexible.

It is therefore the object of the present invention to develop a test device of the type mentioned at the outset such that when the test device is used in a test system for checking transmission procedures in a mobile telephony network, a greater flexibility of the SIM data used in the test process is achieved.

This object is achieved according to the invention by a test device having the features stated in the characterising part of claim 1.

According to the invention, it has been found that although the mobile telephone can communicate with a SIM simulation in the test device, this does not rule out the selective communication of the mobile telephone with at least one physical SIM card. The test process may be selectively carried out using data of the SIM simulation or using data of the physical SIM card with the test device according to the invention. A combination of this SIM data is also possible. This greatly increases the flexibility of the test device when used in a test process.

A switchable connection of the input and output lines according to claim 2 leads to the possibility of a direct data communication between the mobile telephone and the physical SIM card, without this data communication having to run via the SIM simulation processor. In certain tests, the influence of the SIM simulation processor on the data communication between the SIM card and the mobile telephone may thus be reliably ruled out.

Claim 3 provides a proper supply of the physical SIM card via the mobile telephone and avoids the necessity of an additional voltage source. As an alternative, it is possible to supply the SIM card via an external voltage source. In a preferred embodiment of the test device, it is possible to switch over between the various voltage sources, controlled by the SIM simulation processor.

A monitoring module according to claim 4 allows the data flow between the physical SIM card and the mobile telephone to be controlled, which is very informative for test purposes. In this manner, it is possible to detect error sources which occur due to undesirable effects caused by the data communication between the SIM card and the mobile telephone.

An emulation module according to claim 5 again increases the flexibility of the supplied data in the mobile telephone in the test process. The SIM simulation processor can determine via the emulation module which communication-relevant data of the SIM card are suppressed, changed, expanded or replaced. This may serve, for example, to accelerate the test process, but also to test specific scenarios which cannot be achieved with the physical SIM card.

A compatibility module according to claim 6 allows the test process to be carried out even if data communication is desired with a SIM card which is incompatible with the mobile telephone.

A changeover of the voltage supply according to claim 7 also allows the inclusion of physical SIM cards, the supply of which is not possible, for example via the internal voltage source of the mobile telephone. The provision of a plurality of supply voltage levels makes it possible to operate a wide variety of physical SIM cards and to integrate them into the test device.

An embodiment of the invention will be described in more detail in the following with reference to the drawing. The single FIGURE schematically shows components of a test device for use in a test system for checking transmission procedures in a mobile telephony network.

A test system of this type for checking transmission procedures in a mobile telephony network is known from WO 2004/049 746 A1, to which reference will extensively be made.

The local test device denoted overall by reference numeral 1 for use in a test system of this type comprises a mobile telephone 2. The mobile telephone 2 is able to communicate with a subscriber identification module (SIM). In this respect, it is insignificant whether it is a physical SIM card, i.e. a real card, or the emulation or simulation of a SIM card of this type.

The mobile telephone 2 is connected to a microcontroller of a SIM simulation processor 4 via a multi-pole signal line 3. The SIM simulation processor 4 prepares a SIM simulation. The SIM simulation processor 4 is associated locally with the mobile telephone 2 and may be connected to other components (not shown) of the test system.

The signal line 3 comprises the conventional signal connections of a smart-card mobile telephone, i.e. an input and output line 5 (I/O), a clock-pulse supply line 6 (CLK) and a reset line 7 (RST). Furthermore, a supply voltage line 8 (Vcc) leads out from the mobile telephone 2; the function of this line 8 will be described hereinafter.

The test device 1 also comprises a physical SIM card 10. This SIM card 10 is connected to the microcontroller of the SIM simulation processor 4 via a multi-pole signal line 11. The signal line 11 also comprises an input and output line 12 (I/O), a clock-pulse supply line 13 (CLK) and a reset line 14 (RST). The SIM card 10 is connected to an external voltage source 15a or alternatively to a voltage source 15b of the mobile telephone 2 via a supply voltage line 15 (Vcc). A transistor circuit 15c, via which the supply voltage line 15 is connected on the one hand to the supply voltage line 8 and on the other hand to the external voltage source 15a, selects which of the two voltage sources 15a, 15b will supply the SIM card 10. In particular, the two voltage sources 15a, 15b provide different voltage levels. The transistor circuit 15c is connected to a control module 15e of the microcontroller of the SIM simulation processor 4 via a control line 15d, shown in dashed lines in the FIGURE.

The input and output lines 5, 12 are directly interconnected via a connecting line 16. Positioned in the connecting line 16 is a switch 17 which may be activated via a control line 18 (indicated in dashed lines) by a control module 19 of the microcontroller of the SIM simulation processor 4. The switch 17 is shown in its open position in which direct data communication between the input and output lines 5, 12 is impossible.

The microcontroller of the SIM simulation processor 4 has a monitoring module 20 for monitoring data communication between the physical SIM card 10 and the mobile telephone 2. The monitoring module 20 is connected to the signal lines 3 and 11, as shown in dashed lines. The microcontroller of the SIM simulation processor 4 also has an emulation module 21 and a compatibility module 22.

The local data communication may be selectively carried out in the test process via the SIM simulation prepared by the SIM simulation processor 4 or using the physical SIM card 10. The local data communication between the mobile telephone 2 and the SIM simulation processor 4 takes place as described in WO 2004/049 746 A1. A plurality of variants is possible for the selective local data communication between the mobile telephone 2 and the physical SIM card 10. In one of these variants, the switch 17 is closed via the control module 19 and the control line 18, thus allowing direct data communication between the mobile telephone and the SIM card 10. Furthermore, in this variant, the mobile telephone 2 receives the RST signal from the microcontroller of the SIM simulation processor 4. The clock-pulse signal is also transmitted from the reading device of the mobile telephone 2 to the microcontroller of the SIM simulation processor 4 which ensures that the SIM card 10 receives the identical clock-pulse signal via the clock-pulse supply line 13.

Alternatively, in order to ensure a direct communication of data, it is possible to interconnect the entirety of the multi-pole signal lines 3, 11, instead of the two input and output lines 5, 12 by the connecting line 16.

In another variant of the data communication between the mobile telephone 2 and the SIM card 10, the switch 17 is in its open position and all of the data is looped through the microcontroller of the SIM simulation processor 4 via the signal lines 3 and 11. In so doing, the signals transmitted via the signal lines 3, 11 pass through the monitoring module 20, so that the data communication between the SIM card 10 and the mobile telephone 2 may be monitored in the monitoring module 20. The two aforementioned variants ants may also be implemented parallel to one another.

In another variant of the data communication between the mobile telephone 2 and the SIM card 10, as an alternative or in addition, the signals transmitted via the signal lines 3 and 11 are directed via the emulation module 21. Depending on the requirements of the test process, the emulation module 21 is able to suppress specific communication elements of the data communication between the SIM card 10 and the mobile telephone 2 and make a change, expand or replace them using communication elements of a data communication between the SIM simulation prepared by the SIM simulation processor 4 and the mobile telephone 2. For example, specific memory contents of the SIM card 10 may not be transferred to the mobile telephone 2 or may be replaced by other contents.

In another variant of the data communication between the mobile telephone 2 and the SIM card 10, as an alternative or in addition, the data carried by the signal lines 3, 11 is carried by the compatibility module 22. This compatibility module 22 even allows data communication between the SIM card 10 and the mobile telephone 2 when direct data communication between the SIM card 10 and the mobile telephone 2 is impossible due to an incompatibility between these components. For example, data formats may be converted in the compatibility module 22 between the data prepared by the SIM card 10 on the one hand and the data formats which may be received by the mobile telephone 2 on the other hand. An adaptation of the clock-pulse frequency or the initialisation procedure or, via the control module 15e, of the supply voltage is also possible.

The invention claimed is:

1. A test device (1) for use in a test system for checking transmission procedures in a mobile telephony network, comprising a mobile telephone (2) configured such that it is able to communicate with a subscriber identification module (SIM), and comprising a SIM simulation processor (4) locally associated with the mobile telephone (2), to prepare a SIM simulation, the SIM simulation processor (4) being designed to be connected to other components of the test system, wherein the test device (1) also has a physical SIM card (10) connected to the SIM simulation processor (4) such that the mobile telephone (2) is able to communicate selectively with the SIM simulation or with the physical SIM card (10), wherein the physical SIM card (10) is connected to a voltage source (15a) of the mobile telephone (2).

2. A test device according to claim 1, wherein an input and output line (12) between the physical SIM card (10) and the SIM simulation processor (4) is connected to an input and output line (5) between the SIM simulation processor (4) and the mobile telephone (2) via a switch (17) which may be activated by the SIM simulation processor (4).

3. A test device according to claim 1, wherein the SIM simulation processor (4) has a monitoring module (20) for monitoring a communication of data between the physical SIM card (10) and the mobile telephone (2).

4. A test device according to claim 1, wherein the SIM simulation processor (4) has an emulation module (21) configured such that it suppresses specific communication elements of a data communication between the physical SIM card (10) and the mobile telephone (2) and replaces them by communication elements of a data communication between the SIM simulation and the mobile telephone (2).

5. A test device according to claim 1, wherein the SIM simulation processor (4) has a compatibility module (22) configured such that a communication of data is allowed between the physical SIM card (10) and the mobile telephone (2) even if a direct communication of data between the physical SIM card (10) and the mobile telephone (2) is impossible due to these components being incompatible.

6. A test device according to claim 1, wherein the SIM simulation processor (4) has a control module (15e) to activate a selection switch (15c) for presetting one of a plurality of possible voltage sources (15a, 15b) or voltage levels.

7. A test device (1) for use in a test system for checking transmission procedures in a mobile telephony network, comprising a mobile telephone (2) configured such that it is able to communicate with a subscriber identification module (SIM), and comprising a SIM simulation processor (4) locally associated with the mobile telephone (2), to prepare a SIM simulation, the SIM simulation processor (4) being designed to be connected to other components of the test system, wherein the test device (1) also has a physical SIM card (10) connected to the SIM simulation processor (4) such that the mobile telephone (2) is able to communicate selectively with the SIM simulation or with the physical SIM card (10), wherein an input and output line (12) between the physical SIM card (10) and the SIM simulation processor (4) is connected to an input and output line (5) between the SIM simulation processor (4) and the mobile telephone (2) via a switch (17) which may be activated by the SIM simulation processor (4).

* * * * *